Figure 1:
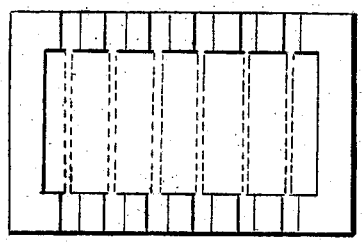
Figure 2:
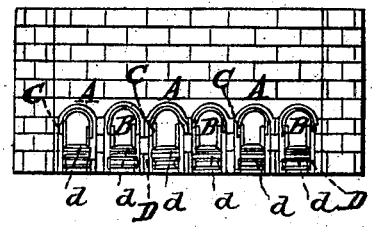
Figure 3:
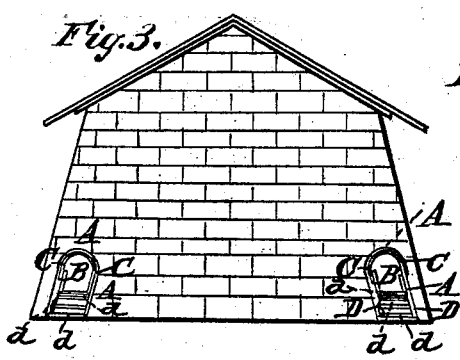
Figure 4:
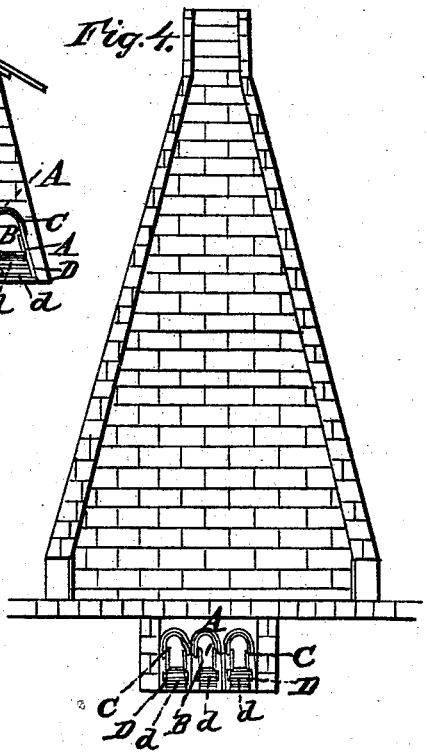
Figure 5:
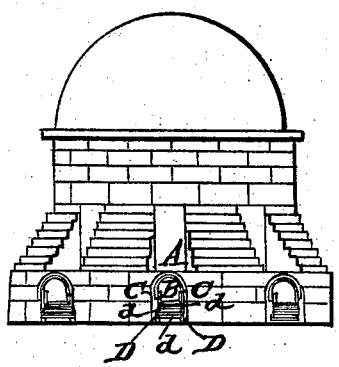

J. M. McCARTHY.
Brick Kiln.

No. 88,316.

2 Sheets—Sheet 1.

Patented March 30, 1869.

Witnesses:

Inventor:

J. M. McCARTHY.
Brick Kiln.

No. 88,316.

2 Sheets—Sheet 2.

Patented March 30, 1869.

Witnesses:

Inventor:

J. M. McCARTHY, OF CANAL DOVER, OHIO.

Letters Patent No. 88,316, dated March 30, 1869.

IMPROVEMENT IN BRICK-KILNS.

The Schedule referred to in these Letters Patent and making part of the same.

*To all whom it may concern:*

Be it known that I, J. M. McCARTHY, of Canal Dover, in the county of Tuscarawas, and in the State of Ohio, have invented certain new and useful Improvements in Brick-Kilns; and do hereby declare that the following is a full, clear, and exact description thereof, reference being had to the accompanying drawings, and to the letters of reference marked thereon.

The principle of brick-burning has never been thoroughly understood, as clay contains so many chemical elements, and always changeable according to the oxides, salts, and calcareous materials they contain. The more those elements are mixed with the pure clay, the more fusible it becomes.

Pure clay, such as silica and alumina, in proper proportions, is infusible to a great degree, but is very difficult to burn sound; hence it is very common to find men spoiling whole kilns of brick.

The great difficulty is in regulating the draught, which regulates the heat. Clay is very delicate, and will not stand sudden expansion or contraction; and the old custom is to introduce fuel on the ground, through the arches, which is very injurious, spoiling the arches, cutting them up, and only burning the centre.

To complete the outside, or heads, it is customary to charge one side and admit draught through the other. This change is alternate, until both sides are burned, thereby causing sudden changes and extremes of heat and cold, resulting in the arch-brick being all chipped up and good for nothing, causing loss of labor and fuel, and often about one-third of the brick.

The next process in use is having bars horizontally, from two to three feet from the ground, at the bottom of the kiln, with sliding or hinged doors.

This process is more dangerous than the first, as fuel burns so rapidly on bars, that great experience is required in burning. This often results, as in the first case, with the addition of great expense in building works.

In both cases, where the weather is boisterous, the draught cannot be controlled.

My invention will obviate all these difficulties, and consists in the construction and arrangement, with a brick-kiln, of a device whereby the draught can be controlled at will in all kinds of weather, and the heads, or ends and centre are burned at the same time, without causing extremes, keeping up moderate heat, which is what clay requires to make sound-burned brick.

In order to enable others skilled in the art to which my invention appertains, to make and use the same, I will now proceed to describe its construction and operation, referring to the annexed drawings, which form a part of this specification, and in which—

Figure 6:
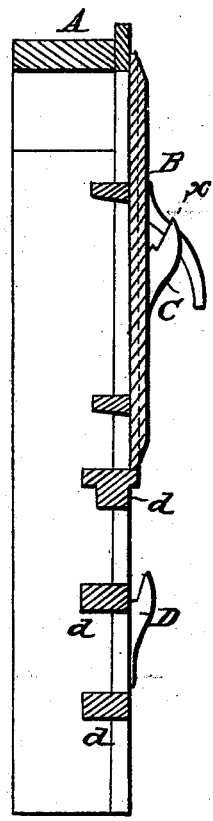
Figure 7:
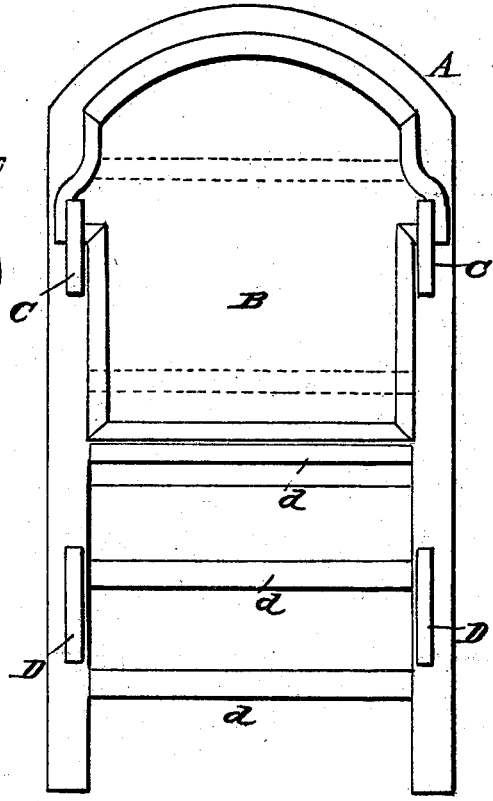

Figure 6 is a vertical cross-section, and
Figure 7 is a front elevation, both enlarged.
Figures 2, 3, 4, and 5, show the invention as applied to different kinds of brick-kilns, and
Figure 1 is a bottom view of the kiln represented in fig. 2.

A represents a metallic frame, of any suitable dimensions, made arched, or curved at the top, as shown, and having a series of bars, $d\ d$, placed horizontally in the lower portions of said frame, for the purpose of strengthening the same.

On the front side, or face of the frame A, are hooks, or lugs, C C, which are provided with stops, or rests, $x$, so as to regulate the adjustable door B.

This door is made with arms, or projections, so as to hook on the lugs C C, and made so as to fit over and close the upper part of the frame A, as shown in figs. 6 and 7.

There are also lugs, D D, secured or cast on the frame A, near its lower end, as shown in the drawings, so as to hang an additional door, if desired, thereby entirely closing the opening in front.

The frame A, thus constructed, is placed in the mouth of the arch of a brick-kiln, and will answer both for permanent and temporary kilns. In the latter case, these frames form an abutment, strengthening the casing.

It is found by experience that close draught is best in brick-burning, as heat increases draught. Now, when the doors are closed, the heat will escape up the heads, and thus the heat and the direction of it can be controlled at will.

Coal, peat, or wood can be used with economy by this arrangement, in making sound-burned brick, this being the object of my invention.

The door or doors to the frame A should, however, be so constructed that they could be left partially open for the purpose of regulating the draught, as above mentioned.

Having thus fully described my invention,

What I claim as new, and desire to secure by Letters Patent, is—

Providing the mouth of the arches of a brick-kiln with a metallic frame, A, having horizontal bars, $d\ d$, and suitable lugs, or projections, C C, D D, to place one or more adjustable doors, B, upon, said doors being so constructed that they may be entirely closed, or partially opened, substantially as and for the purposes herein set forth.

In testimony that I claim the foregoing, I have hereunto set my hand, this 21st day of February, 1868.

J. M. McCARTHY.

Witnesses:
M. R. SHALTERS,
SAMUEL RAY.